March 19, 1940.   U. C. DUNAWAY   2,194,386
INSULATING POLE
Filed June 18, 1938
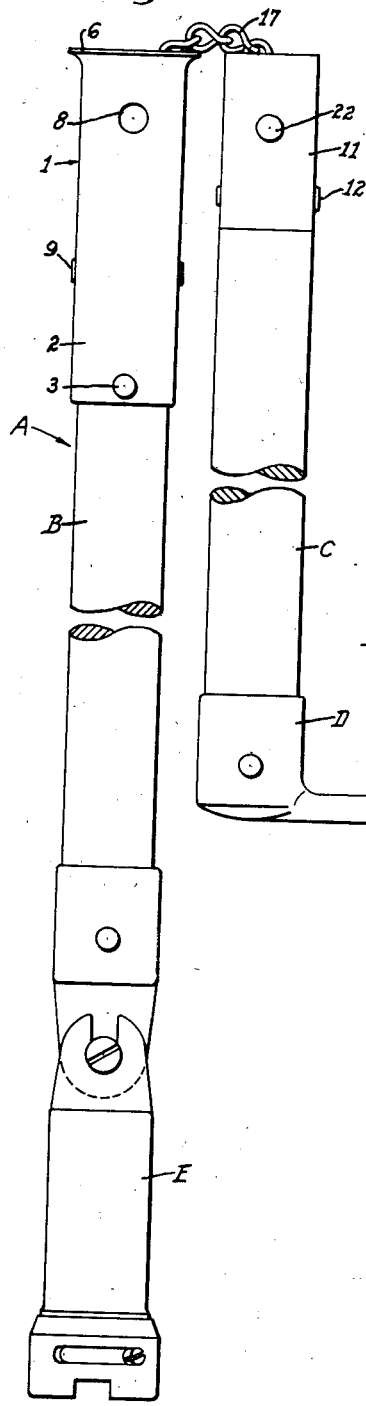
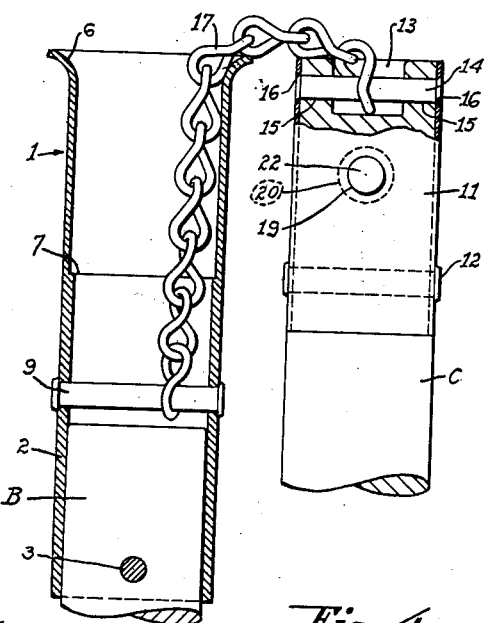
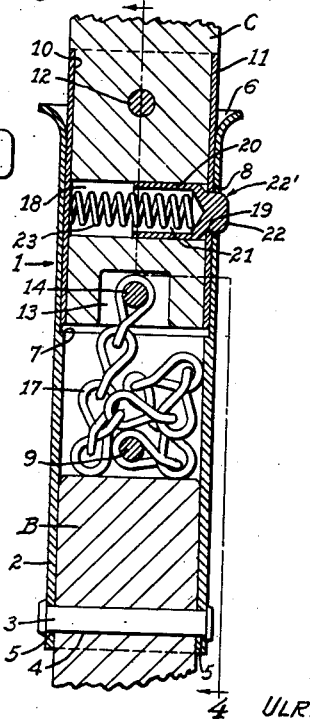
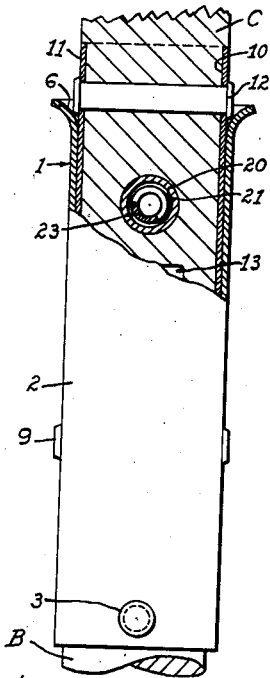
INVENTOR
ULRICH C. DUNAWAY
ATTORNEY Patented Mar. 19, 1940

2,194,386

UNITED STATES PATENT OFFICE 2,194,386

INSULATING POLE

Ulrich C. Dunaway, St. Louis, Mo., assignor to James R. Kearney Corporation, St. Louis, Mo., a corporation of Missouri Application June 18, 1938, Serial No. 214,533

2 Claims. (Cl. 287—119)

This invention relates generally to insulating poles and more specifically to an improved insulating pole of the type which is made up of a plurality of connected sections and to which pole are attached tools and other devices employed in the installation and maintenance of electrical equipment associated with overhead electrical conductors carrying high voltages, the predominant object of the invention being to provide an improved pole of this type which includes a splice so constructed and arranged that the likelihood that a lineman would employ in connection with his work, a section only of an insulated pole, instead of a complete pole of the proper length to give to the lineman the required insulating protection is minimized.

Insulating poles of the type to which this invention relates afford insulating protection to users of the poles, working with energized high voltage electrical conductors, which is in proportion to the lengths of the poles. These poles, therefore, usually are of very considerable length so as to give the insulating protection required when the poles are employed in working with conductors carrying very high voltages, and to provide for reducing the lengths of the poles so that they may be transported in trucks and otherwise conveniently carried, the poles frequently are made in sections which are detachably attached together by suitable splicing means. Because of indifference to danger or hurry linemen frequently neglect to select and attach together a plurality of pole sections to provide a complete pole of the proper length to afford the required insulating protection, and in the past linemen have been seriously injured and even killed because of this neglect.

The predominant object of this invention is to provide an insulating pole which is made up of a plurality of detachable sections so that the pole may be reduced in length when this is required. However the sections of the insulating pole of the present invention are permanently connected together by flexible means which permits the pole sections to be folded to reduce the length of the pole but prevents complete disassociation of the associated pole sections. Thus, when a lineman picks up an insulating pole for use the sections of the pole are loosely connected together and all that he need do to provide a usable pole of the required length is to rigidly connect the pole sections together by a very simple operation. This entirely eliminates the need for the lineman to look about for a proper pole section to attach to a pole section which he has already selected as was the case heretofore, and renders improbable the chance that the lineman would use only a part of the required pole length. As a matter of fact the use of a section only of a pole provided with the improved splice disclosed herein would hardly ever be attempted as the loosely hanging associated pole section would interfere with proper manipulation of the pole.

Fig. 1 is an elevation of an insulating pole constructed in accordance with the invention disclosed herein, portions of the sections of the pole being broken away to permit the pole to be illustrated on a larger scale, and the pole sections being shown in their detached relation.

Fig. 2 is an enlarged fragmentary view partly in elevation and partly in section illustrating the splice of the improved pole and showing the associated pole sections in their detached relation.

Fig. 3 is a fragmentary vertical section taken through the splice of the improved pole and through pole sections associated therewith and showing the pole sections in their rigid assembled relation.

Fig. 4 is a section-elevation taken on line 4—4 of Fig. 3.

In the drawing, wherein is shown for the purpose of illustration, merely, one embodiment of the invention A designates in Fig. 1 an insulating pole constructed in accordance with the present invention and including the improved splice 1. The pole A is made up of a pair of pole sections B and C which are adapted to be rigidly attached together by means of the pole splice 1 in a manner to be hereinafter explained, said pole sections preferably being made of lengths of wood which have been suitably treated so that they possess the desired insulating value. The pole A illustrated in Fig. 1 is provided at its opposite ends with tools adapted for use with respect to electrical equipment ordinarily associated with overhead electrical conductors, the pole section C having fixed thereto a switch stick head D and the pole section B having associated therewith a clamp stick head E. Obviously many types of tools other than the switch stick head D and the clamp stick head E, illustrated in Fig. 1, are associated with insulating poles of the type to which this invention relates, these particular tools having been shown, merely, to illustrate a complete pole.

Fixed to the pole section B is a sleeve 2 which embraces an end portion of said pole section and is secured thereto by a pin 3 that extends through an opening 4 formed through said pole section and passes through apertures 5 formed through opposed wall portions of the sleeve. The sleeve 2 extends outwardly beyond the end of the pole section B to provide an elongated tubular socket and the outer end portion of said sleeve is flared outwardly as indicated at 6. Also the outer portion of the wall of the sleeve 2 may be of less thickness than is the inner portion of the wall of said sleeve as shown in Figs. 2 and 3 whereby an annular shoulder 7 is present within the sleeve at the junction of the thinner and the thicker wall portions thereof. The wall of the sleeve 2 has an opening 8 formed therethrough for a purpose to be hereinafter set forth, and extended transversely of said sleeve at a point adjacent to the end face of the pole section B located within the sleeve is a pin 9 which is suported in opposed apertures formed in the wall of the sleeve.

The inner end portion of the pole section C is of slightly reduced diameter as shown to the best advantage in Fig. 3, to provide an annular depression 10 in which is seated a tubular element 11. By seating the tubular element 11 in the depression 10 its surface is arranged flush with the surface of the outer portion of said pole section which is of normal diameter, and said tubular element 11 is secured to the pole section C by a transversely extended pin 12 which extends through an opening formed through the pole section and through opposed apertures formed in the wall of the tubular element. The tubular element 11 terminates at its outer end flush with the inner end face of the pole section C, and formed in the inner portion of the pole section C is a cavity 13. Extended transversely of the cavity 13 is a pin 14 which passes through alined openings 15 formed in portions of the pole section at opposite sides of said cavity and is seated at its opposite ends in apertures 16 formed in opposed wall portions of the tubular element 11 (Fig. 2). The pin 14 has attached thereto a section of chain 17, the opposite end of said chain being attached to the pin 9 previously mentioned herein as being associated with the sleeve 2.

Formed transversely of the pole section C is an opening 18, said opening 18 at one end being closed by a portion of the tubular element 11 and the portion of the tubular element at the opposite end of the opening being provided with an opening 19 which coincides with the opening 18 but is of smaller diameter than said opening 18. Disposed within the opening 18 for sliding movement therein is a locking element 20 having a cavity 21 formed therein and provided with an extension 22 of slightly reduced diameter which extends through the opening 19 formed in the tubular element 11. Associated with the locking element 20 is an expansible coil spring 23 which contacts at one of its ends with the portion of the tubular element that closes an end of the transverse opening 18, the opposite end portion of said coil spring being extended into the cavity 21 of the locking element 20 with its end in contact with a wall portion of said cavity.

When an insulating pole constructed and arranged in accordance with the present invention is not in use the pole sections thereof are detached in so far as rigid attachment provided by the locking element 20 is concerned. However, the pole sections are loosely connected together by the length of chain 17 so that said pole sections may not become completely disassociated from each other. Also when the pole sections are out of rigid connection with each other but are loosely connected by the length of chain 17 they may be arranged in folded, parallel relation with respect to each other to permit of the pole being stored in limited space. When it is desired to assemble the pole sections of the pole in rigid relation for use, the pole sections are moved to positions where they are in longitudinal alinement with respect to each other. The tubular element 11 is then moved into the socket provided by the sleeve 2 until the extension 22 of the locking element 20 snaps into the opening 8 of said sleeve whereupon the pole sections will be very securely fixed together to provide a rigid pole.

It is to be noted that the flared end portion 6 of the sleeve 2 serves to facilitate introduction of the tubular element 11 into the socket provided by the sleeve when the pole sections are being rigidly connected together. Also the curvature of the inner face of the flared portion 6 of the sleeve 2 and the curved outer edge 22' of the extension 22 of the locking element 20 coact with each other when the pole sections are being rigidly connected together to cam the locking element inwardly of the opening 18 against the expansive action of the coil spring 23 so that the tubular element 11 of the pole section C will move freely into the socket provided by the sleeve 2. In order to limit inward movement of the tubular element 11 with respect to sleeve 2 when the pole sections are being rigidly assembled, the opposed end portions of the pin 12 contact with the inner face of the flared end portion 6 of the sleeve as shown in Fig. 4, when the tubular element has reached the proper inward position for the extension 22 of the locking element 20 to enter the opening 8 of the sleeve 2. Obviously when it is desired to detach the pole sections from rigid connection the extension 22 of the locking element 20 need only be moved inwardly out of the opening 8 of the sleeve whereupon the pole sections may be drawn apart.

I claim:

1. A pole comprising a pair of pole sections, means for detachably connecting said pole sections together in rigid relation, said means comprising a sleeve fixed to one of said pole sections at an end thereof and extended outwardly beyond said end of said pole section to provide a socket, a tubular element fixed to the other of said pole sections at an end thereof and adapted for insertion into the socket provided by said sleeve, a locking device for locking said tubular element and said sleeve together, a pin extended transversely of said sleeve, a pin extended transversely of said tubular element, a flexible element attached to said pins at its opposite end for connecting the pole sections together when they are out of rigidly connected relation with respect to each other, and an element which aids in securing said tubular element to the pole section with which it is associated, said element being adapted to contact with a portion of said sleeve to limit inward movement of said tubular element relative to said sleeve.

2. A pole comprising a pair of pole sections, means for detachably connecting said pole sections together in rigid relation, said means comprising a sleeve fixed to one of said pole sections at an end thereof and extended outwardly beyond said end of said pole section to provide a socket, a tubular element fixed to the other of said pole sections at an end thereof and adapted for insertion into the socket provided by said sleeve, a locking device for locking said tubular element and said sleeve together, a pin extended transversely of said sleeve, a pin extended transversely of said tubular element, a flexible element attached to said pins at its opposite end for connecting the pole sections together when they are out of rigidly connected relation with respect to each other, and a pin which extends transversely of said tubular element and the pole section with which it is associated to aid in securing said tubular element to said pole section, the last-mentioned transverse pin being extended at its opposite ends outwardly beyond the surface of said tubular element and said outwardly extended portions of said pin being adapted to contact with a portion of said sleeve to limit inward movement of said tubular element relative to said sleeve.

ULRICH C. DUNAWAY.